(12) United States Patent
Yu

(10) Patent No.: US 6,533,346 B2
(45) Date of Patent: Mar. 18, 2003

(54) VEHICLE DOOR GUARD APPARATUS

(76) Inventor: Zu-Sheng Yu, 253 Marshall Ave., West Hempstead, NY (US) 11552

( * ) Notice: Subject to any disclaimer, the term of this patent is extended or adjusted under 35 U.S.C. 154(b) by 0 days.

(21) Appl. No.: 09/880,671

(22) Filed: Jun. 13, 2001

(65) Prior Publication Data

US 2002/0190539 A1 Dec. 19, 2002

(51) Int. Cl.[7] .................................................. B60J 3/00
(52) U.S. Cl. ..................... 296/152; 296/146.9; 49/460; 16/431; 292/336.3
(58) Field of Search ........................... 296/146.1, 146.9, 296/152; 293/126, 128; 49/460, 503; 292/336.3, DIG. 2, DIG. 3, DIG. 63; 16/412, 431, DIG. 12

(56) References Cited

U.S. PATENT DOCUMENTS

| | | | | |
|---|---|---|---|---|
| 2,610,084 A | * | 9/1952 | Anderson | 16/412 |
| 2,678,232 A | * | 5/1954 | Barry | 293/1 |
| 3,243,222 A | * | 3/1966 | Loughary et al. | 16/86 A |
| 3,280,510 A | * | 10/1966 | Vaux | 293/1 |
| 3,473,264 A | * | 10/1969 | Holka | 293/1 |
| 3,879,895 A | * | 4/1975 | Hinderks | 49/462 |
| 4,839,991 A | * | 6/1989 | Rathgeb | 49/462 |
| 5,910,077 A | * | 6/1999 | Aumiller et al. | 16/412 |

* cited by examiner

Primary Examiner—Stephen T. Gordon
Assistant Examiner—Patricia L. Engle
(74) Attorney, Agent, or Firm—F. Chau & Associates, LLP

(57) ABSTRACT

A vehicle door guard apparatus for providing protection against damage to a door exterior due to impact with outside objects. The apparatus includes a door handle pivotally attached to a vehicle door and pivotally attached to a first end of a rod using a pivot. A second end of the rod is fixedly connected to a vehicle body, wherein when the vehicle door is opened, the door handle is caused to be rotated outwards to protrude from the vehicle door.

20 Claims, 5 Drawing Sheets

VEHICLE DOOR GUARD APPARATUS

BACKGROUND

1. Technical Field

The present invention relates generally to vehicle door guards, and more specifically, to a vehicle door handle having an apparatus for protecting vehicle doors from damage due to impact when the door is opened.

2. Description of Related Art

Vehicle doors are especially vulnerable to damage at the time they are opened for entering and exiting a vehicle due to the risk of impact with outside objects. There is a high possibility of vehicle door damage in parking lots for example, where vehicles are usually arranged in rows and opening a vehicle door runs a high risk of bumping another vehicle parked alongside, thus damaging both vehicles. This risk is further compounded due to more crowded parking lots, narrower parking spaces and the popularity of larger and wider vehicles such as minivans and sport utility vehicles.

Conventional door guards involve a rubber strip for covering a portion of an edge of the door and sometimes also include reflective materials for increasing visibility. However, such door guards are not only unsightly but they offer little actual protection for the door itself, since any impact is still likely to dent the underlying portion of the door that is covered by the rubber strip. In addition, due to the varying heights of doors of different vehicles, complete protection is unlikely for a door protected with a such a door guard.

Accordingly, an easily installable vehicle door guard apparatus which provides effective and discrete protection against damage to a door exterior due to impact with outside objects, is highly desirable.

SUMMARY OF THE INVENTION

The present invention is directed to an improved vehicle door guard apparatus that is easily installable and provides effective and discreet protection for vehicle doors due to impact with outside objects. Advantageously, a door guard apparatus according to the present invention not only provides a barrier to protect the exterior of the door from damage, but also absorbs the force of the impact and assists in closing the door to minimize the impact itself.

According to an aspect of the present invention, a vehicle door guard apparatus is provided comprising a door handle having a proximal portion and a distal portion, said door handle being rotatably attached to a vehicle door; a lever; and a rod connected to the proximal portion of said door handle at a first end using the lever, said rod being connected to a vehicle body at a second end, wherein when the vehicle door is opened, the door handle is caused to be protruded from the vehicle door.

In another aspect of the present invention, a vehicle door guard apparatus is provided comprising a door handle having a proximal portion and a distal portion, said door handle being pivotally secured to a vehicle door by a joint; a lever having a first end, a second end, and a pivot point, said pivot point having means for receiving a rotatable fixing means for rotatably connecting the lever to the vehicle door, wherein the first end of the lever is pivotally connected to said proximal portion of the door handle; and a rod installed lengthwise along the vehicle door, the rod having a first end and a second end, said first end of the rod being pivotally connected to the second end of the lever and said second end of the rod being fixedly attached to a vehicle body, wherein when the vehicle door is opened, the lever is caused to be rotated, thereby protruding the door handle from the vehicle door.

These, and other aspects, features and advantages of the present invention will be described or become apparent from the following detailed description of the preferred embodiments, which is to be read in connection with the accompanying drawings.

DETAILED DESCRIPTION OF PREFERRED EMBODIMENTS

Figure 1A:
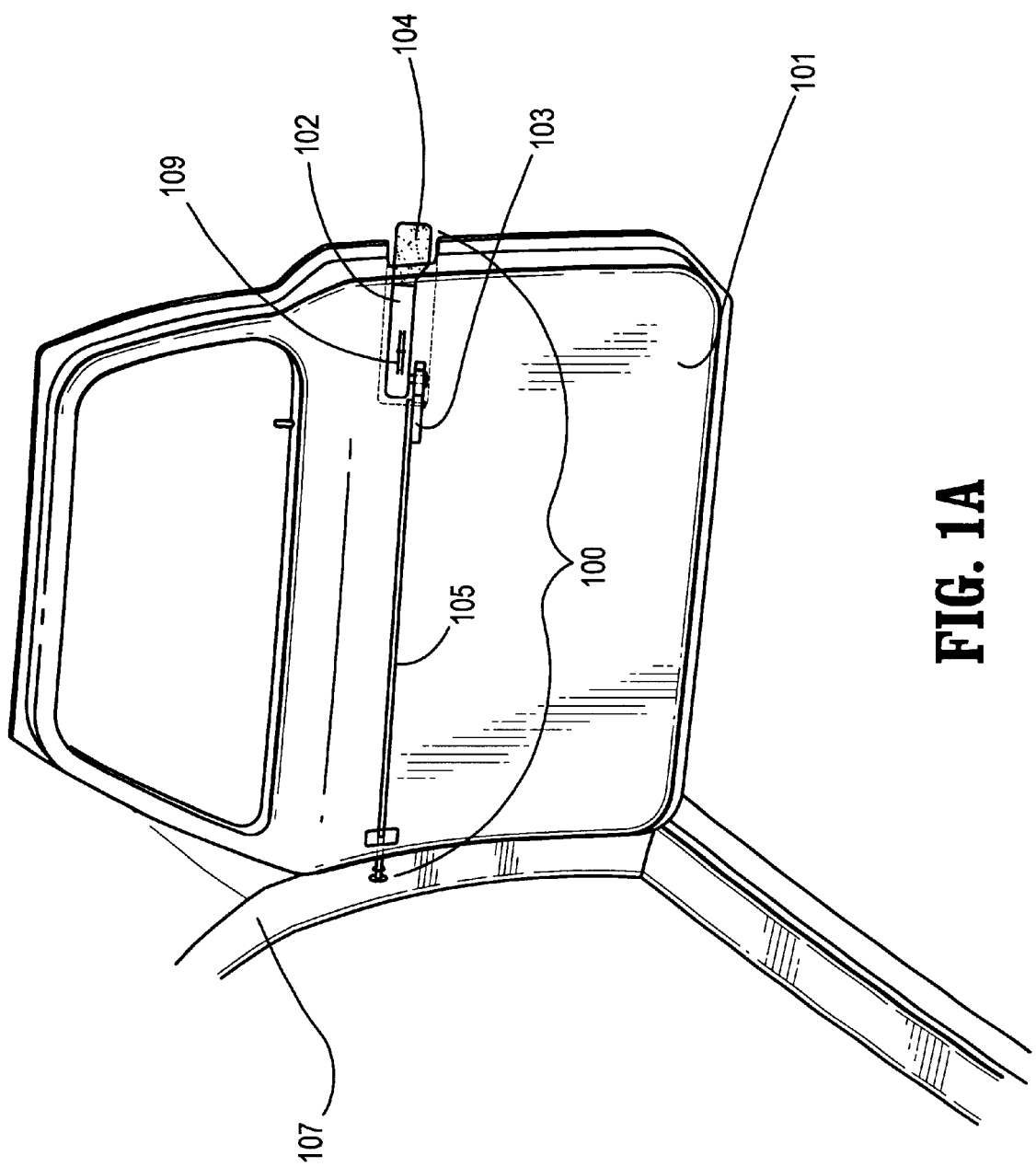
FIG. 1A depicts an example of a vehicle door guard device installed on a vehicle door according to an aspect of the present invention.

Referring now to the Figures, the illustration of FIG. 1A depicts an example of a vehicle door guard device 100 installed on a vehicle door 101 according to an aspect of the present invention. In general, the door guard device 100 comprises a door handle 102 pivotally attached to a first end of a rod 105 using a lever 103. A second end of the rod 105 is fixedly connected to a vehicle body 107.

A distal portion of the door handle 102 is preferably comprised of, for example, a force-absorbing material 104 for protecting an end of the door handle and external objects if the door handle impacts another object when the door 101 is opened. The force-absorbing material 104, may be comprised of, for example, rubber, vinyl, foam, or any soft, shock-absorbing material. Alternatively, the force-absorbing material 104 may extend beyond the distal portion of the door handle to cover any additional amount of or an entire portion of the door handle 102. In addition, the door handle 102 itself may be comprised of the force-absorbing material. The door handle 102 also includes a joint 109 for stabilizing the door handle against the door 101 while allowing lateral movement of the door handle.

Figure 1B:
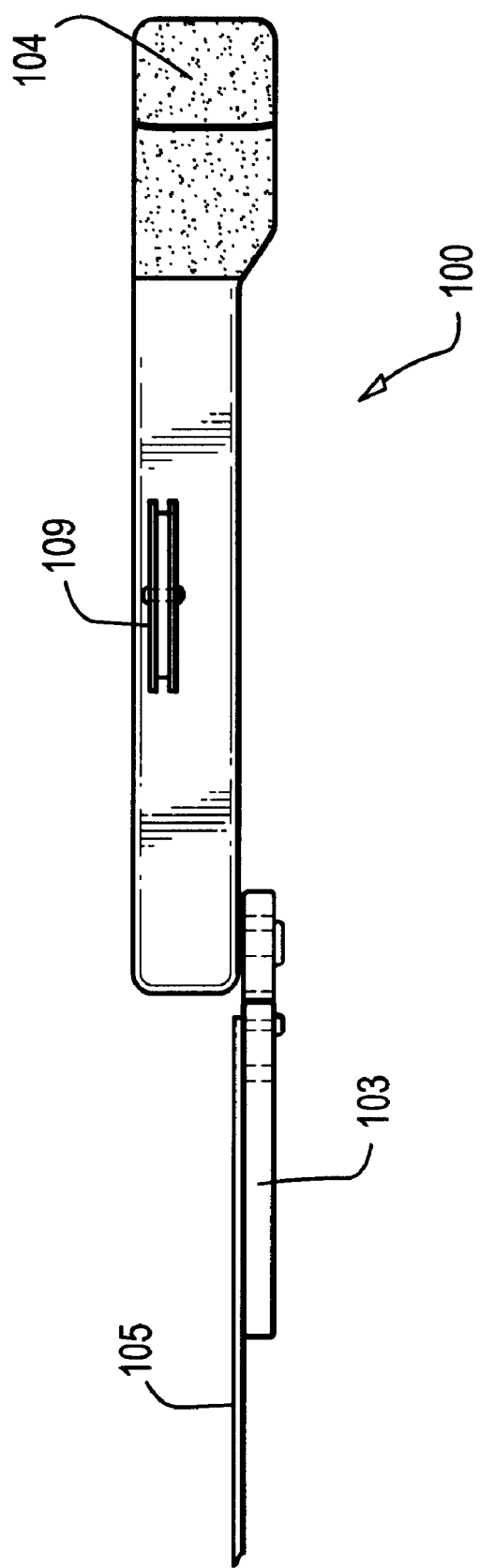
FIG. 1B depicts an exemplary exploded view of the vehicle door guard apparatus of FIG. 1A according to an aspect of the present invention.

FIG. 1B depicts an exemplary exploded view of the vehicle door guard apparatus of FIG. 1A according to an aspect of the present invention.

Figure 2A:
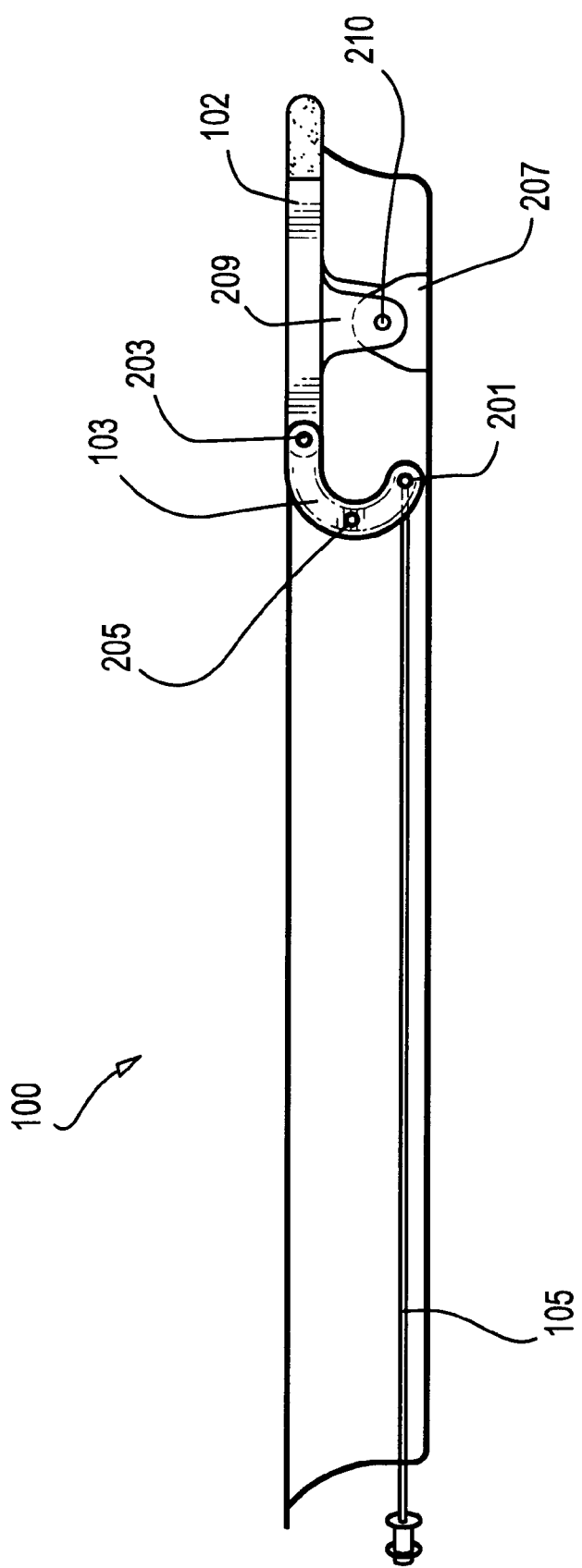
FIG. 2A depicts an exemplary illustration of a top view of the door guard in a closed door according to an aspect of the present invention.

FIG. 2A depicts an exemplary illustration of a top view of the door guard 100 in a closed door according to an aspect of the present invention. The lever 103 is preferably, for example, U-shaped and is movably connected to the first end of the rod 105 and a proximal portion of the door handle 102 at a first end 201 and a second end 203, respectively. The first and second ends 201 and 203 of the lever, and the proximal portion of the door handle and the first end of the rod may each include an opening through which a rotatable fixing means can be inserted for such movable connection. The lever 103 is axially rotatable and includes an opening 205 through which a rotatable fixing means can be inserted to rotatably secure the lever to the vehicle door 101. The rotatable fixing means described above may comprise, for example, a bolt.

The joint 109 comprises a base portion 207 having a first end fixedly mounted on the vehicle door 101, and a pivoting portion 209 having a first end fixedly attached to the door handle 102. A second end of the base portion 207 is pivotally attached to a second end of the pivoting portion 209 on a pivot point 210.

Figure 2B:
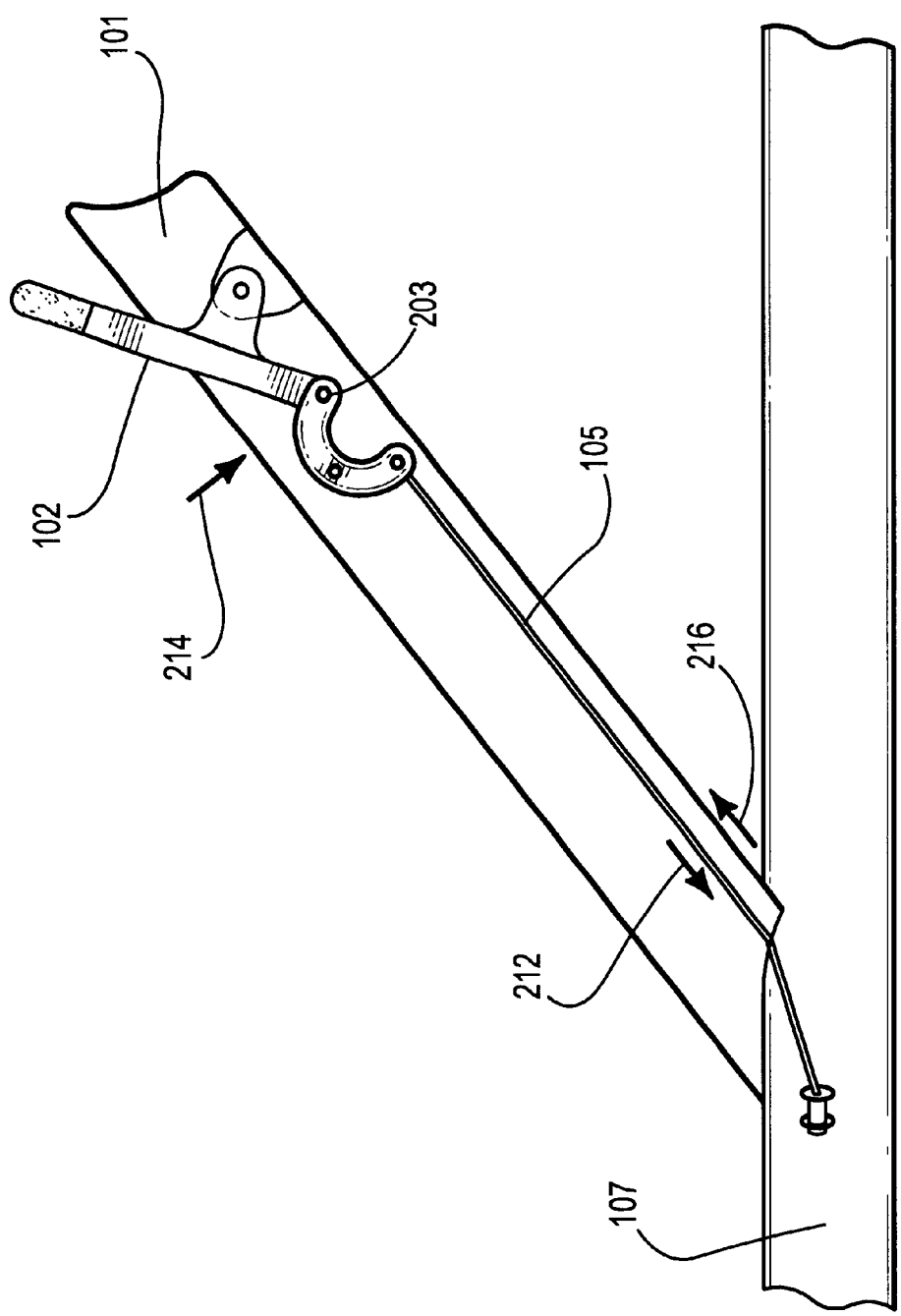
FIG. 2B illustrates an exemplary illustration of a top view of the door guard in an open vehicle door according to an aspect of the present invention.

FIG. 2B illustrates an exemplary illustration of a top view of the door guard 100 in an open vehicle door according to an aspect of the present invention. When the vehicle door 101 is open, a force is exerted on the rod 105 in the direction of 212 due to the rod's fixed connection to the vehicle body 107, thus causing the lever 103 to be rotated such that the second end 203 of the lever is caused to be pushed in a direction 214. As a result, door handle 102 is rotated outwards to protrude from the vehicle door 101. The door handle may protrude from the vehicle up to, for example, about 45 degrees from the vehicle door 101, depending on the amount which the door is opened.

Advantageously, the protruded door handle provides a buffer zone between the vehicle door and outside objects. A fully extended door handle according to the present invention may protrude, for example, about 3 inches from the door, thus acting as a shock absorber to absorb impact and thereby minimizing damage if an outside object is struck by the protruded handle. In addition, if the protruded door handle strikes another object, the force of the impact will cause the door handle to rotate the lever such that the rod is pulled towards a direction 216, thereby assisting in closing the door.

Figure 3:
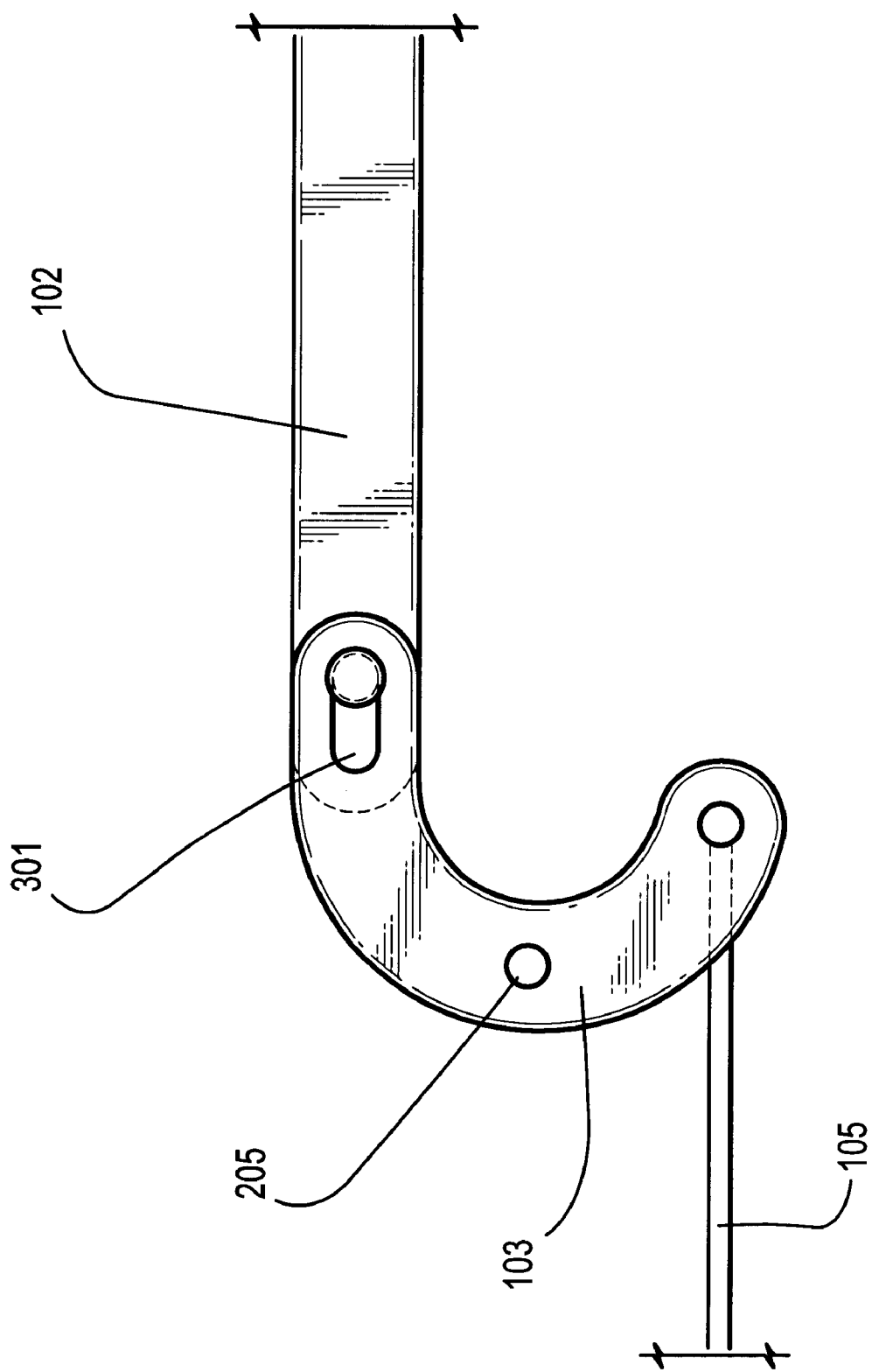
FIG. 3 depicts an alternative embodiment in which a lever includes an elongated opening for allowing sliding and rotational movement of the lever with respect to a door handle according to an aspect of the present invention.

FIG. 3 depicts an alternative embodiment in which the lever 103 includes an elongated opening 301 for allowing sliding and rotational movement of the lever with respect to the door handle.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the present invention.

What is claimed is:

1. A vehicle door guard apparatus comprising:
   a door handle having a proximal portion and a distal portion, said door handle being rotatably attached to a vehicle door;
   a lever having a first end and a second end, the second end of said lever is movably connected to the proximal portion of said door handle; and
   a rod having a first end and a second end, the first end of said rod is movably connected to the first end of said lever and the second end of said rod is connected to a vehicle body, wherein when the vehicle door is opened, the door handle is caused to be protruded from the vehicle.

2. The apparatus of claim 1, wherein the lever comprises a pivot point, said pivot point including a rotatable fixing means for rotatably connecting the lever to the vehicle door, wherein the second end of the lever is pivotally connected to the proximal portion of the door handle and when said distal portion of said door handle contacts an object, the door handle moves inward thereby assisting in the closing of a vehicle door.

3. The apparatus of claim 1, wherein said first end of the rod is pivotally connected to a first end of the lever, and said second end of the rod is fixedly attached to the vehicle body.

4. The apparatus of claim 1, wherein the lever is U-shaped.

5. The apparatus of claim 1, wherein the distal portion of the door handle is comprised of a force-absorbing material.

6. The apparatus of claim 1, wherein the door handle is comprised of a force-absorbing material.

7. The apparatus of claim 1, wherein the door handle is covered by a force-absorbing material.

8. The apparatus of claim 1, wherein the door handle is rotatably attached to the vehicle door by a joint.

9. The apparatus of claim 1, wherein the door handle is protruded from the vehicle door about 0 degrees to about 45 degrees.

10. The apparatus of claim 2, wherein said rotatable fixing means is a bolt.

11. The apparatus of claim 8, wherein the joint comprises:
    a base portion having a first end and a second end, said first end being fixedly mounted on the vehicle door; and
    a pivoting portion having a first end and a second end, said first end being fixedly attached to said door handle, wherein the second end of the base poriton is pivotally attached to the second end of the pivoting portion.

12. A vehicle door guard apparatus comprising:
    a door handle having a proximal portion and a distal portion, said door handle being pivotally secured to a vehicle door by a joint;
    a lever having a first end, a second end, and a pivot point, said pivot point having means for receiving a rotatable fixing means for rotatably connecting the lever to the vehicle door, wherein the first end of the lever is pivotally connected to said proximal portion of the door handle; and
    a rod installed lengthwise along the vehicle door, the rod having a first end and a second end, said first end of the rod being pivotally connected to the second end of the lever and said second end of the rod being fixedly attached to a vehicle body, wherein when the vehicle door is opened, the lever is caused to be rotated, thereby protruding the door handle from the vehicle door and when said distal portion of said door handle contacts an object, the door handle moves inward thereby assisting in the closing of a vehicle door.

13. The apparatus of claim 12, wherein the distal portion of the door handle is comprised of a force-absorbing material.

14. The apparatus of claim 12, wherein the lever is U-shaped.

15. The apparatus of claim 12, wherein the first end of the lever includes an elongated opening for allowing the lever to be slidably pivotable in relation to the door handle.

16. The apparatus of claim 12, wherein said rotatable fixing means is a bolt.

17. The apparatus of claim 12, wherein the joint comprises:

a base portion having a first end and a second end, said first end being fixedly mounted on the vehicle door; and a pivoting portion having a first end and a second end, said first end being fixedly attached to said door handle, wherein the second end of the base portion is pivotally attached to the second end of the pivoting portion.

18. The apparatus of claim 12, wherein the door handle is protruded from the vehicle door about 0 degrees to about 45 degrees.

19. The apparatus of claim 12, wherein the door handle is comprised of a force-absorbing material.

20. The apparatus of claim 12, wherein the door handle is covered by a force-absorbing material.

* * * * *